Patented Jan. 23, 1945

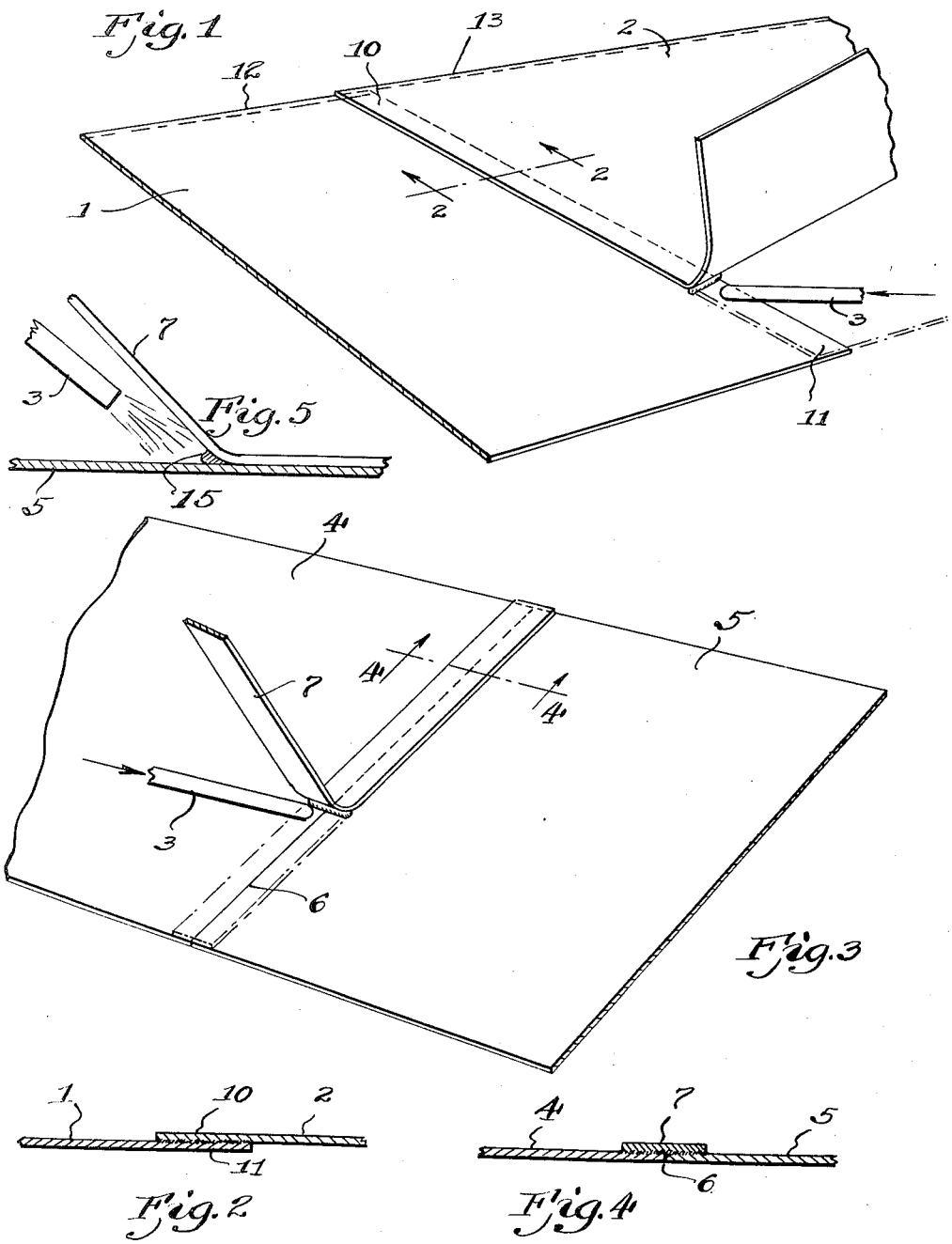

2,367,725

UNITED STATES PATENT OFFICE 2,367,725

METHOD FOR JOINING THERMOPLASTIC MATERIALS

Gunnar Lindh and William M. Phillips, Jr., Detroit, Mich., assignors to The Udylite Corporation, Detroit, Mich., a corporation of Delaware Application February 17, 1943, Serial No. 476,228

3 Claims. (Cl. 154—42)

This invention relates to a method for forming and joining thermoplastic materials.

Heretofore two surfaces of certain thermoplastic materials have been joined by inserting between then soldering irons or electrically heated resistance elements to melt the surfaces, withdrawing the heating instrument and then pressing the surfaces together. However, difficulties have been encountered in this method of joining thermoplastic materials because of the small difference between the melting point or complete softening point of the thermoplastic material and the temperature at which the material chars and causes porosity in the joint. Welding thermoplastics with flame is very hard to control because the flame is very hot and material chars. Exact temperature control in the joining of thermoplastic material is made particularly difficult because the poor heat conductivity of the thermoplastic materials introduces a very precise time factor which is difficult to control in practice. Furthermore, the thermoplastic materials when molten are sometimes very viscous and do not flow to fill any depression resulting from variations in the application of heat from point to point on the surface. Finally, charred materials adhere to the heating tool and make it necessary to clean it at frequent intervals.

It is the object of this invention to join surfaces of thermoplastic members by heating the surfaces so as to avoid local over-heating and to insure the even application of heat over a relatively large surface.

The invention also contemplates a method for joining thermoplastic surfaces which is easily practiced, which permits the surfaces being heated to be at all times visually observed while being heated and thereby prevent charring of the thermoplastic material.

The invention also contemplates the joining together of parts, and especially flexible sheets, of thermoplastic materials.

The method is particularly useful in lining a tank with a continuous non-porous coating of thermoplastic material, for example, a tank for holding the electrolyte in electroplating. It has been found that these objects may be achieved and that the several disadvantages of the methods and means heretofore used for joining thermoplastic materials can be obviated by directing a gaseous substance of the desired temperature onto or between the surfaces to be joined together to heat them and transform them to the desired consistency and then permit them to touch each other with or without the application of external pressure. In a variation of this method two surfaces or sheets of thermoplastic material are butted up against each other end for end. A strip of the same or similar thermoplastic material is placed over the butted ends, and the abutting surfaces and the strip are heated by a gaseous substance at the proper temperature and then joined.

In the drawing:

Fig. 1 shows two sheets of thermoplastic material being joined by our method.

Fig. 2 is a section along the line 2—2 of Fig. 1.

Fig. 3 shows two sheets of thermoplastic material being joined by a variation of our method.

Fig. 4 is a section along the line 4—4 of Fig. 3.

Fig. 5 is a sectional view through the sheets in the process of being welded.

Referring more particularly to the drawing there is shown two articles of thermoplastic material which are to be joined or welded together. As herein shown by way of example, the articles 1 and 2 are sheets of thermoplastic material. Sheets 1 and 2, as shown, are arranged to be joined or welded together at their overlapping edges 10 and 11. Preparatory to welding, edges 12 and 13 of sheets 1 and 2 are first lined up with edge 10 overlapping edge 11. Thereupon a hot gas from nozzle 3 is directed upon the surface of sheets 1 and 2 between the overlapping edges 10 and 11 until the thermoplastic material reaches the proper consistency to join the two sheets 1 and 2 together at their edges.

The temperature of the gas flowing from nozzle 3 will depend upon the temperature at which the thermoplastic material from which sheets 1 and 2 are made softens sufficiently to weld the sheets together. The temperature of the hot gas flowing from nozzle 3 should be at least sufficiently high to soften the thermoplastic material. With an unskilled operator the temperature of the gas should preferably be below the charring temperature of the thermoplastic material, but with a skilled operator, or automatic equipment, controlling the rate of travel and direction of the hot gas blast, the temperature of the gas can be above the charring temperature of the thermoplastic material and the rate of welding thus increased. A temperature slightly above the melting temperature of the thermoplastic material is a suitable temperature at which to have the gas flowing from nozzle 3. Where the temperature of the gas is higher than the charring point of the thermoplastic material, the operator will visually observe the condition of the adjacent surfaces to be joined so that he will move nozzle 3 as soon as the material becomes soft enough or melts so that the edges will weld and before the material chars. If the temperature of the gas blast at the surfaces to be joined is too high above the charring temperature of the thermoplastic material, then, due to the low thermal conductivity of a thermoplastic material, such, for example, as "Saran B," the outer surfaces of the thermoplastic sheets will char before the sheets will melt or soften to a sufficient depth to obtain a good, or what may be termed a commercially satisfactory, weld. In practice, welding of a thermoplastic, such, for example, as "Saran B," has been very successful with a gas or air blast having a temperature of 600-700° F. at the jet or outlet of the gas nozzle and where the jet or outlet is held substantially from 3/8 to 1/2 of an inch from the surfaces being welded as it is moved along in the welding operation. Thus, the temperature of the gas or air at the surfaces being welded is substantially 400-430° F. and in any event above the charring temperature of the "Saran B." As stated above, when operating at this temperature the surfaces are visually observed and the nozzle or jet moved along as soon as the plastic surfaces soften or melt sufficiently to weld and before the surfaces char. Charring of the thermoplastic material is easily and visually observed or discernible by any skilled operator.

The hot or pre-heated gas or gases flowing from nozzle 3 can be any gas which is inert with respect to the thermoplastic material such as preheated air or one of its component gases, or a hot gas resulting from the combustion of two gases such as acetylene and oxygen or hydrogen and oxygen and hot exhaust gases from internal combustion engines.

When the hot gases flowing from nozzle 3 soften or melt the surfaces of, or the edge portions 10 and 11 of sheets 1 and 2, they join or weld together to form a homogeneous connection between sheets 1 and 2. This joining of the soft surfaces takes place if the edges 10 and 11 touch or contact without external pressure, but, if desired, the welding can be assisted by the application of external pressure to these edges. As the edges 10 and 11 soften and weld, nozzle 3 is moved along edge 11 and edge 10 is gradually brought down upon edge 11 to weld the same together. Preferably the hot gas nozzle is directed at surfaces 10 and 11 where they are actually in contact so that as the surfaces in actual contact soften or melt they join or weld together.

As a variation of the above method, the welding of sheets 1 and 2 along their edges can be supplemented by the use of a weld rod or strip of similar or different thermoplastic material having similar softening characteristics. In some cases a weld rod of thermoplastic material having a lower melting point than that of the surfaces to be joined may be preferred. In such case the hot gas blast will be directed simultaneously against the two surfaces being joined and against the weld rod or strip. The jet will be directed against the weld rod or strip so that the end of the weld rod becomes a completely molten mass which becomes integrated with the softened or molten surfaces being welded together. The hot gas blast can be directed principally at the end of the weld rod so that the end of the weld rod will completely melt by the time the surfaces being joined have softened or melted to a sufficient depth to insure a good weld.

In Fig. 3 there is shown a variation of the method shown in Fig. 1. In this instance the thermoplastic sheets 4 and 5 are placed with their edges abutting along the joint 6. A thin strip of similar or different thermoplastic material of similar softening characteristics 7 is then positioned over the joint. The surfaces of sheets 4 and 5 adjacent the joint 6 and the under surface of strip 7 are then heated by hot gas flowing from nozzle 3 in the manner above described until these surfaces become soft enough or melt so that they can be welded together. As illustrated in the drawing, as the hot gas softens the thermoplastic material the strip 7 is gradually brought down in contact with sheets 4 and 5 over joint 6. The welding of the strip 7 and sheets 4 and 5, if desired, can be accompanied by the application of pressure to strip 7 and sheets 4 and 5 along the joint 6. However, pressure is not necessary because when the melted or softened under surface of strip 7 and upper surfaces of sheets 4 and 5, adjacent joint 6, contact or touch each other they weld together. The application of external pressure to assist in the weld is preferable.

The surfaces to be welded together should be free from dirt and foreign material which interferes with the complete joining or welding of the surfaces and causes defective joints. Therefore, it is advisable to clean the surfaces to be joined either chemically with a grease and oil solvent, such as ethyl acetate or methyl ethyl ketone, or mechanically by abrading or scraping the surfaces to be joined. The hot gas blast should be directed at both surfaces to be joined so that each is soft or near the melting point to facilitate welding or joining the surfaces together.

Although the above method of welding by means of a hot gas blast is useful on all thermoplastic materials, it is particularly useful and commercially well adapted for welding the vinyl resins or thermoplastic polymerized vinyl compounds such, for example, as "Saran B-115," a trade name for a copolymer of vinylidene chloride and vinyl chloride, "Saran F-125," a trade name for a copolymer of vinylidene chloride and vinyl cyanide, "Vinylite," a trade name for a copolymer of vinyl chloride and vinyl acetate, polystyrene (polymerized styrene), polymers of vinyl benzene, polymers of vinyl chloride, polymers of vinyl acetate.

The temperature or temperature range at which well-known thermoplastic materials soften or melt, as well as the temperature at which these thermoplastic materials char, are known. In any event these temperatures are easily ascertained. For example, a sheet of "Saran B-115," thickness 1/16 of an inch, was immersed in paraffin and the temperature of the paraffin gradually raised. The "Saran B-115" sheet was stiff throughout temperatures from 140° F. to 240° F.; from 240° F. to 300° F. the sheet was pliable, that is, manually pliable; from 300° F. to 340° F. the sheet began to melt; from 340° F. to 360° F. the sheet became quite plastic and melted; from 360° F. to 400° F. the viscosity of the melted "Saran B-115" decreases and at the upper temperature limit decomposition or charring set in.

The charring temperature of "Saran B-115" was also arrived at by tests utilizing a hot gas blast flowing from nozzle 3 described above. The nozzle 3 was adjusted to give a welding speed of one-half of a linear foot per minute. The maximum temperature at the jet was 620° F. The temperature of the air immediately adjacent the surfaces being joined or welded ran from 400° F. to 410° F. The preferred temperature of the surfaces being joined to obtain a satisfactory weld ranges from about 325° F. to 360° F. for "Saran B-115." Charring of the "Saran" occurred when the surface temperature ranged between 390° F. and 400° F.

The surfaces being welded should be heated to their welding or melting temperatures, but obviously not to their charring temperature. The surfaces must be melted to a sufficient depth to cause joining of the thermoplastic surfaces. The thermal conductivity of the thermoplastic material is a factor in arriving at the upper possible temperature limit of the hot gas blast at the surfaces being welded because the temperature of the gas blast at the surfaces must not be so high that the surfaces will be charred before sufficient heat penetrates the thermoplastic to melt the surfaces to a sufficient depth to create a good bond or weld.

A good practical test in the welding of these plastics is illustrated in Fig. 5. There the hot gas blast from nozzle 3 is directed at the surfaces being welded so that as strip 7 is brought down on sheets 5 and 4 a bead or puddle 15 of melted plastic is squeezed from between the surfaces being joined. This bead is roughly about $\frac{3}{32}$ of an inch in diameter and extends completely across the meeting line of the surfaces being joined. The skilled operator will direct the nozzle 3 so that this bead is always present between strip 7 and sheets 4 and 5 as they are welded and at the same time will carefully observe the surfaces and move his nozzle accordingly so that the surfaces do not char. As long as the bead 15 is present and as long as the surfaces being joined do not char, the operator knows that his hot gas blast is at the proper temperature and that the surfaces being joined are being heated to a proper joining or welding temperature.

We claim:

1. A method for joining thermoplastic material comprising holding the surfaces to be welded adjacent each other, directing a stream of hot gas simultaneously against adjacent portions of the surfaces to be joined until the said adjacent areas of the surfaces melt sufficiently to form a bead of molten thermoplastic material between the two surfaces at their joint and bringing the thus heated surfaces together and simultaneously moving the stream of hot gas along the surfaces to be joined at a rate sufficient to maintain a bead of freshly molten thermoplastic material between the surfaces adjacent their junction at all times as the surfaces are heated and brought together to join the same.

2. A method for joining thermoplastic material comprising holding the surfaces to be joined adjacent each other, directing a stream of hot gas between the surfaces to be joined and moving the stream of hot gas along the surfaces to be joined at a rate sufficient to heat the surfaces to their melting temperatures and below their charring temperatures and simultaneously bringing the surfaces together in the path of the stream of hot gas at a rate sufficient to form a bead of freshly molten thermoplastic material at the junction of the surfaces to be welded and maintaining a bead from freshly molten thermoplastic material between the surfaces being welded at their junction as the surfaces are brought together.

3. A method for joining thermoplastic material comprising holding the surfaces to be welded adjacent each other along a line of junction, directing a stream of hot gas simultaneously against portions of the surfaces to be joined adjacent said line of junction until said areas reach their softening or welding temperature and sufficient of the thermoplastic material from each of the adjacent surfaces melts to form a bead of molten thermoplastic material along the line of junction, moving the hot gas blast along between the surfaces to be welded in a direction from the joined area toward the area to be joined at a rate coordinated with the bringing together of the thus heated surfaces in a direction from the joined toward the adjacent heated surfaces so that a bead of freshly molten material is at all times present at the junction as the material is joined.

GUNNAR LINDH.
WILLIAM M. PHILLIPS, Jr.